United States Patent
Suzuki et al.

[11] Patent Number: 6,083,012
[45] Date of Patent: Jul. 4, 2000

[54] REAR COMBINATION LAMP

[75] Inventors: Takanori Suzuki; Takayoshi Endo; Sakai Yagi, all of Shizuoka, Japan

[73] Assignee: Yazaki Corporation, Tokyo, Japan

[21] Appl. No.: 09/187,089

[22] Filed: Nov. 5, 1998

[30] Foreign Application Priority Data

Nov. 6, 1997 [JP] Japan ................................. 9-304563

[51] Int. Cl.[7] .................................................. F21V 29/00
[52] U.S. Cl. ............................ 439/57; 362/226; 439/918; 439/949
[58] Field of Search ................................ 439/56, 57, 546, 439/699.1, 918, 214, 942, 949; 362/543, 548, 544, 226, 247

[56] References Cited

U.S. PATENT DOCUMENTS

| | | | |
|---|---|---|---|
| 3,604,919 | 9/1971 | MacPherson | 439/57 |
| 4,040,709 | 8/1977 | Dola et al. | 439/211 |
| 4,246,632 | 1/1981 | Hancox | 439/56 |
| 4,303,297 | 12/1981 | Smart et al. | 439/650 |
| 5,529,535 | 6/1996 | Forish | 362/548 |
| 5,536,174 | 7/1996 | Forish | 439/57 |
| 5,797,766 | 8/1998 | Tanigawa | 439/56 |
| 5,941,633 | 8/1999 | Saito | 362/543 |

FOREIGN PATENT DOCUMENTS

| | | |
|---|---|---|
| 3-20979 | 1/1991 | Japan . |
| 6-11206 | 2/1994 | Japan . |
| 6-275117 | 9/1994 | Japan . |

*Primary Examiner*—Neil Abrams
*Attorney, Agent, or Firm*—Sughrue, Mion, Zinn, Macpeak & Seas, PLLC

[57] ABSTRACT

A rear combination lamp comprises a lamp body (2) including socket mounting portions (3) and a lens portion (6), and sockets (20). Lamps are respectively attached to the sockets. Each of the socket mounting portions has a hollow construction of a generally truncated pyramid-shaped. Conductors (4, 11) are mounted on rear end portions of the socket mounting portions to form a predetermined circuit. Connection terminals (23) each having a conductor contact portion (24) are arranged within the sockets. The respective conductor contact portions project from flanges (22) or socket bodies (21) of the sockets so as to contact the respective conductors. When the respective sockets are mounted in the respective socket mounting portions, the respective conductors can be electrically connected to the respective lamps through the conductor contact portions of the connection terminals. The socket mounting portions may include ribs (10), fixing ribs (7) and fixing holes (9) for installing the conductors (4).

10 Claims, 6 Drawing Sheets

REAR COMBINATION LAMP

BACKGROUND OF THE INVENTION

1. Field of the Invention

The present invention relates to a rear combination lamp for a vehicle.

The present application is based on Japanese Patent Application No. Hei. 9-304563, which is incorporated herein by reference.

2. Description of the Related Art

There have heretofore been known various rear combination lamps. For example, Unexamined Japanese Patent Publication No. Hei. 6-275117 discloses a rear combination lamp as shown in FIG. 11. In FIG. 11, a base plate 100 of a rectangular tray-like shape is defined by a rectangular back plate 101 and a peripheral wall 102 formed perpendicularly on a peripheral edge portion of the back plate 101, and the peripheral wall 102 is notched or removed at one corner portion of the base plate 100, and a connector 120 is mounted on this corner portion. Holding ribs 103 for holding wires W in position, press-connecting ribs 104 for holding the wires W for press-connecting purposes, and fixing bosses 105 for fixing sockets 130 are formed on an upper surface of the back plate 101.

A wire groove 103a, having a width slightly smaller than the thickness or diameter of the wire W, is formed in an upper surface of the holding rib 103, and similarly, a wire groove 104a is formed in an upper surface of the press-connecting rib 104. The socket 130 has a pair of fixing legs 134 each having a fixing hole 134a, and press-connecting terminals 132 each having a downwardly-open, slit-like notch, are received within the socket 130.

For installing the wires W in the rear combination lamp of the above construction, each wire W is first pressed into the wire grooves 103a of the holding ribs 103, and is held thereby, and also is connected to the wire groove 104a in the press-connecting rib 104. Then, the fixing holes 134a, formed respectively in the fixing legs 134 of each socket 130, are aligned respectively with the fixing bosses 105 on the back plate 101, and the socket 130 is pressed, thereby fitting the fixing holes 134a respectively in the fixing bosses 105. As a result, the wire W, held in the wire groove 104a in the press-connecting rib 104, is press-fitted into the notch in the press-connecting terminal 132 received within the socket 130, and at the same time a sheath of the wire W is cut, and the terminal within the socket is brought into contact with a conductor of the wire W, so that the socket 130 and the wire W are electrically connected together. Finally, lamps are attached respectively to the sockets 130, thus completing the assembling operation.

A rear combination lamp as shown in FIG. 12 is disclosed in Unexamined Japanese Patent Publication No. Hei. 3-20979. In FIG. 12, spring retainer plates 201 and socket support bases 202 are formed upright on a base plate 200. An electrically-conductive socket 203, having a pair of lamp holding portions 204 of an arcuate cross-section, is fitted in the socket support base 202. A downwardly-extending spring tongue 213 is formed integrally on a top plate 212 of the socket 203.

In this combination lamp, wiring is provided using a flexible printed circuit board 210. First, terminal portions 211 of the flexible printed circuit board 210 are passed respectively through slits (not shown) formed through the base plate 200, and each terminal portion 211 is inserted between the spring tongue 213 and lamp holding portions 204 of the associated socket 203. Then, a lamp 220, having a lamp terminal 221 at its rear end, is fitted between the lamp holding portions 204, so that the lamp terminal 221 and the terminal portion 211 of the flexible printed circuit board are electrically connected together.

However, the above conventional rear combination lamps have the following problems. In the rear combination lamp disclosed in Unexamined Japanese Patent Publication No. Hei. 6-275117, there is required the base plate 100 which has many fixing ribs 103 and the press-connecting ribs 104 for the purpose of arranging and installing the wires W, and therefore the costs of the component parts are high, and besides the operation for press-connecting the socket 130 to the wires W is troublesome, and therefore the productivity has been poor.

In the rear combination lamp disclosed in Unexamined Japanese Patent Publication No. Hei. 3-20979, also, there is required the base plate 200, and it is necessary to prepare various flexible printed circuit boards 210 for various kinds of vehicles having different structures and sizes, and these have increased the production cost.

SUMMARY OF THE INVENTION

With the above problems in view, it is an object of the present invention to provide a rear combination lamp which has a reduced number of component parts, and can be easily assembled.

In order to solve the above problems, according to the first aspect of the present invention, there is provided a rear combination lamp which comprises: a lamp; a socket holding the lamp, the socket including a plurality of connection terminals which are electrically connected to the lamp; a plurality of conductor contact portions respectively formed on the connection terminals; a socket mounting portion, including: a socket mounting port in which the socket is detachably mounted, the socket mounting port being formed in a rear side of the socket mounting portion, a reflection mirror provided on an inner surface of the socket mounting portion, and a front open portion formed in a front side of the socket mounting portion; a lens portion sealingly closing the front open portion of the socket mounting portion; a plurality of conductor mounting grooves formed in an end portion of the socket mounting port; and a plurality of conductors respectively mounted in the conductor mounting grooves; wherein when the socket is mounted in the socket mounting port, the conductors are respectively held in electrical contact with the conductor contact portions. Accordingly, the conductors are mounted directly on the socket mounting portion, and therefore there is no need to provide a board or a flexible printed circuit board, and the number of the component parts is reduced. And besides, the conductors can be mounted automatically.

Furthermore, according to the second aspect of the present invention, in the rear combination lamp of the first aspect, the conductors include wire-like conductors, the conductor mounting grooves include wiring grooves formed in a rear end surface of the socket mounting portion, and wherein the wire-like conductors are respectively installed in the wiring grooves. Accordingly, each wire-like conductor is cut into a required length, and is installed on the rear end surface of the socket mounting portion, and by doing so, the wiring can be easily applied to various vehicles having different structures and sizes.

Furthermore, according to the third aspect of the present invention, in the rear combination lamp of the second aspect, the socket includes a socket body and a flange, the conductor contact portions each has resiliency, and the conductor contact portions respectively project from the flange so as to electrically contact the respective wire-like conductors when the socket is mounted in the socket mounting port. Accordingly, when the socket is mounted in the socket mounting port, the conductor contact portions are automatically brought into contact with the wire-like conductors, respectively, and therefore a press-connecting step is not necessary.

Furthermore, according to the fourth aspect of the present invention, in the rear combination lamp of the second aspect or the third aspect, the socket mounting portion has wiring ribs, and wherein the wire-like conductor is held between the wiring ribs. Accordingly, the strength of holding the wire-like conductor on the socket mounting portion is enhanced.

Furthermore, according to the fifth aspect of the present invention, the rear combination lamp of the first aspect may further comprises conductor holding recesses formed in an inner peripheral surface of the socket mounting port, wherein the conductors include plate-like conductors, the plate-like conductors are respectively mounted in the conductor holding recesses. Accordingly, an electrical connection between the conductor contact portion and the conductor is positively made. And besides, each of the plate-like conductors allows a large current to flow therethrough, and this construction can be applied to a large-current circuit.

Furthermore, according to the sixth aspect of the present invention, in the rear combination lamp of the fifth aspect, the socket includes a socket body and a flange, the conductor contact portions each has resiliency, and the conductor contact portions respectively project from the socket body so as to electrically contact the respective plate-like conductors when the socket is mounted in the socket mounting port. Accordingly, when the socket is mounted in the socket mounting port, the conductor contact portions are automatically brought into electrical contact with the plate-like conductors, respectively, and therefore a press-connecting step is not necessary.

Furthermore, according to the seventh aspect of the present invention, in the rear combination lamp of the fifth aspect or the sixth aspect, the socket mounting portion has insulating ribs, and wherein the plate-like conductors are respectively held in the insulating ribs. Accordingly, the circuits of the plate-like conductors are kept insulated from each other in the vicinity of the socket mounting portion, and also the strength of holding the plate-like conductor on the socket mounting portion is enhanced.

Furthermore, according to the eighth aspect of the present invention, in the rear combination lamp of the first aspect, a plurality of the socket mounting portions respectively include the socket mounting ports, a plurality of the conductor mounting grooves formed in the respective end portions of the socket mounting ports, and a plurality of the conductors respectively mounted in the conductor mounting grooves, and wherein respective one of the conductors are mounted in the conductor mounting grooves respectively formed in the end portions of at least two of the socket mounting ports.

DETAILED DESCRIPTION OF THE PREFERRED EMBODIMENTS

Preferred embodiments of rear combination lamps of the present invention will now be described in detail with reference to FIGS. 1 to 10.

First Embodiment

Figure 1:
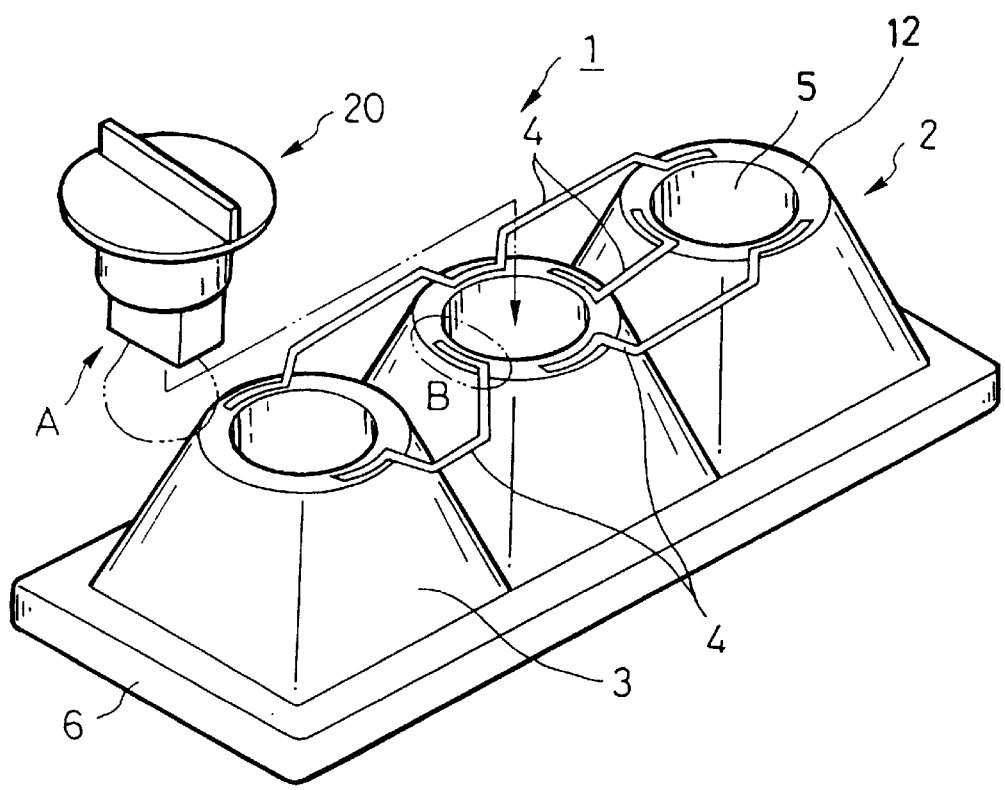
FIG. 1 is an exploded, perspective view showing a first embodiment of a rear combination lamp of the present invention.

FIG. 1 shows a rear combination lamp 1 according to a first embodiment of the present invention. The rear combination lamp 1 comprises a lamp body 2 and sockets 20. First, the construction of the lamp body 2 will be described. The lamp body 2 is made of a resin or the like, and includes hollow socket mounting portions 3 of a generally truncated pyramid-shape, and a lens portion 6 formed integrally with bottoms of these socket mounting portions.

An upper portion of a peripheral wall of the socket mounting portion 3 is bent radially inwardly toward an axis thereof to form a rear end surface 12, and an inner peripheral edge of the rear end surface 12 defines a socket mounting port 5. A reflection mirror (not shown) is provided on an inner surface of the socket mounting portion 3 so as to suppress a loss of lamp light within the lamp body 2.

Figure 3:
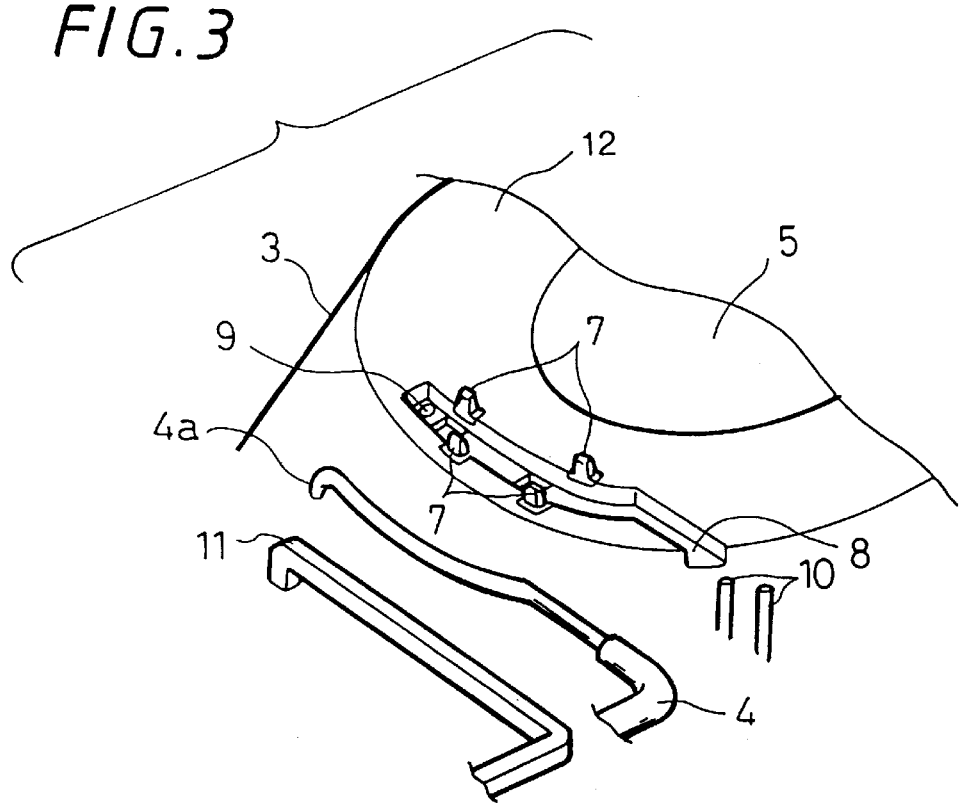
FIG. 3 is an enlarged, perspective view of a portion B of FIG. 1.

As shown best in FIG. 3, wiring grooves (conductor mounting grooves) 8 are formed in the rear end surface 12 of the socket mounting portion 3. A fixing hole 9 is formed in a distal end of the bottom of the wiring groove 8, and fixing ribs 7 are formed perpendicularly on opposite side edge portions of the wiring groove 8. A pair of wiring ribs 10 are formed on the outer surface of the socket mounting portion 3.

For installing a wire 4 (in the form of a wire-like conductor) on the socket mounting portion 3 of the above construction, the wire 4, having a distal end portion from which a sheath has been removed, is first held between the wiring ribs 10. Then, an exposed portion 4a of the wire is fitted into the wiring groove 8, and also a distal end of the wire exposed portion 4a is inserted into the fixing hole 9. Finally, the fixing ribs 7 are fused, thereby fixing the wire 4 in the wiring groove 8, thus completing the wiring operation. Instead of the wire 4, a plated wire can be installed in the same manner.

Figure 2:
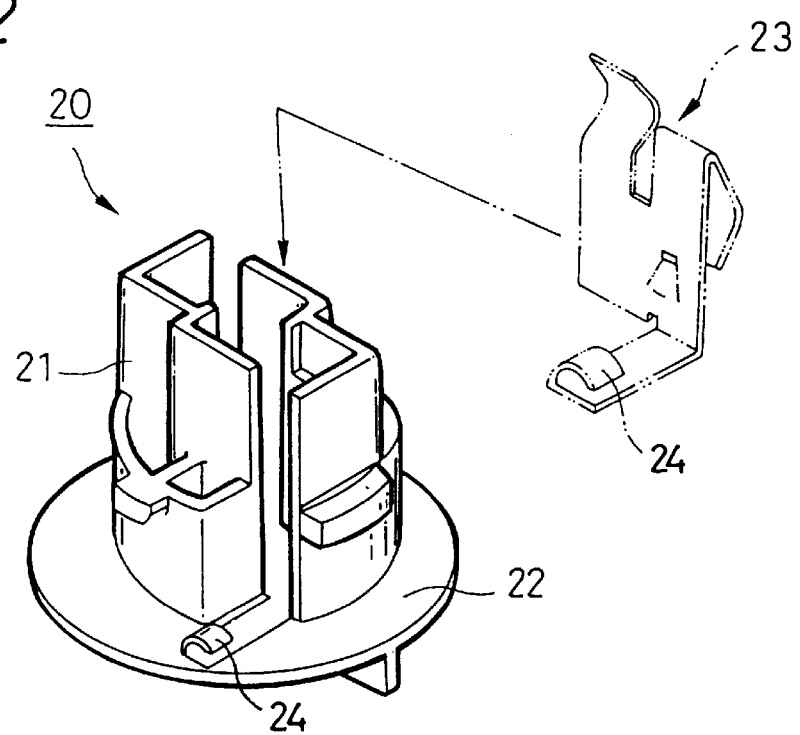
FIG. 2 is a view of a socket as seen in a direction of arrow A of FIG. 1.

Next, the construction of the socket 20 will be described with reference to FIG. 2. As shown in this Figure, a socket body 21 is fixedly secured to a flange 22. The socket body 21 as well as the flange 22 is made of a resin or the like. A connection terminal 23, mounted in the socket body 21, has a conductor contact portion 24 which is formed by bending a relevant portion of a plate material, and is resilient. The connection terminal 23 is provided within the socket body 21 by insert molding or post mounting in such a manner that the conductor contact portion 24 projects upwardly (FIG. 2) from the flange 22.

Figure 4:
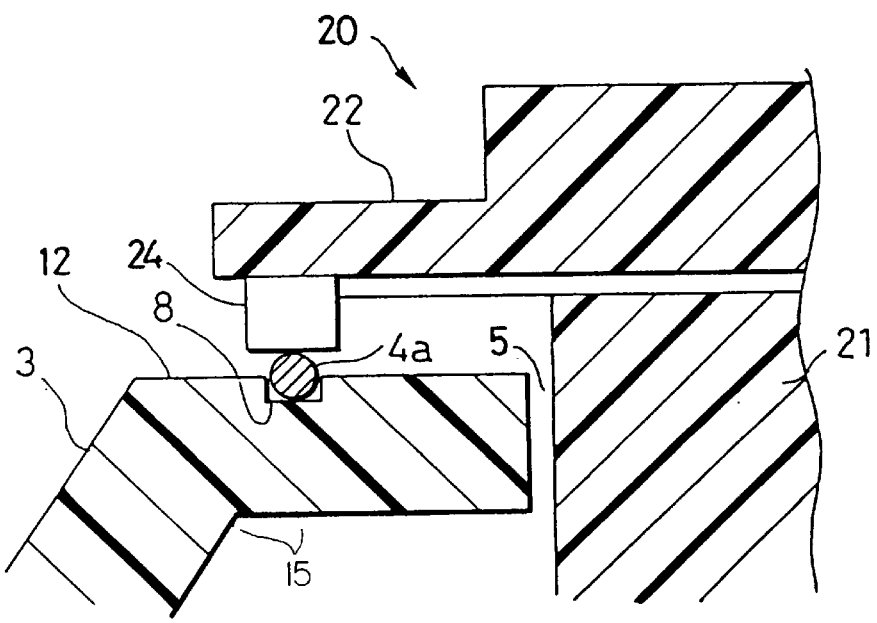
FIG. 4 is an enlarged cross-sectional view of the portion B of FIG. 1.

FIG. 4 shows a condition in which the socket 20 of the above construction is mounted on the socket mounting portion 3. The socket 20 is inserted in the socket mounting port 5, and the socket 20 is retained on the socket mounting portion 3 by a retaining portion (not shown), and as is clear from FIG. 2, the conductor contact portion 24 is held in contact with the wire exposed portion 4a of the wire installed in the wiring groove 8.

In the rear combination lamp 1 of this embodiment, the wiring grooves 8 are formed in the rear end surface 12 of the socket mounting portion 3, and the wire 4 or the plated wire 11 is provided in the wiring groove 8. Thus, the wire-like conductors are installed directly on the lamp body 2, and therefore there is no need to use a board or a flexible printed circuit board, and the number of the component parts is reduced, so that the production cost is reduced. Each of the wire-like conductors is suitably cut into a required length, and is installed in the wiring groove 8, and by doing so, this construction can be applied to various vehicles having different structures and sizes, and therefore a high versatility is obtained. If the installation of the wire-like conductors is effected automatically, the efficiency of the production is enhanced.

The conductor contact portion 24 projects from the flange 22 of the socket 20 so as to contact the wire-like conductor. Therefore, when the socket 20 is mounted on the lamp body 2, the conductor contact portion 24 is automatically brought into contact with the wire-like conductor, and therefore an assembling step, such as a press-connecting step, is not necessary, and the production efficiency is further enhanced.

The pair of wiring ribs 10 for holding the wire 4 or the plated wire 11 therebetween are formed on the outer surface of the socket mounting portion 3. Therefore, the strength of holding the wire-like conductor 4 on the socket mounting portion 3 is increased, and therefore the reliability of the rear combination lamp 1 is enhanced.

Second Embodiment

Figure 5:
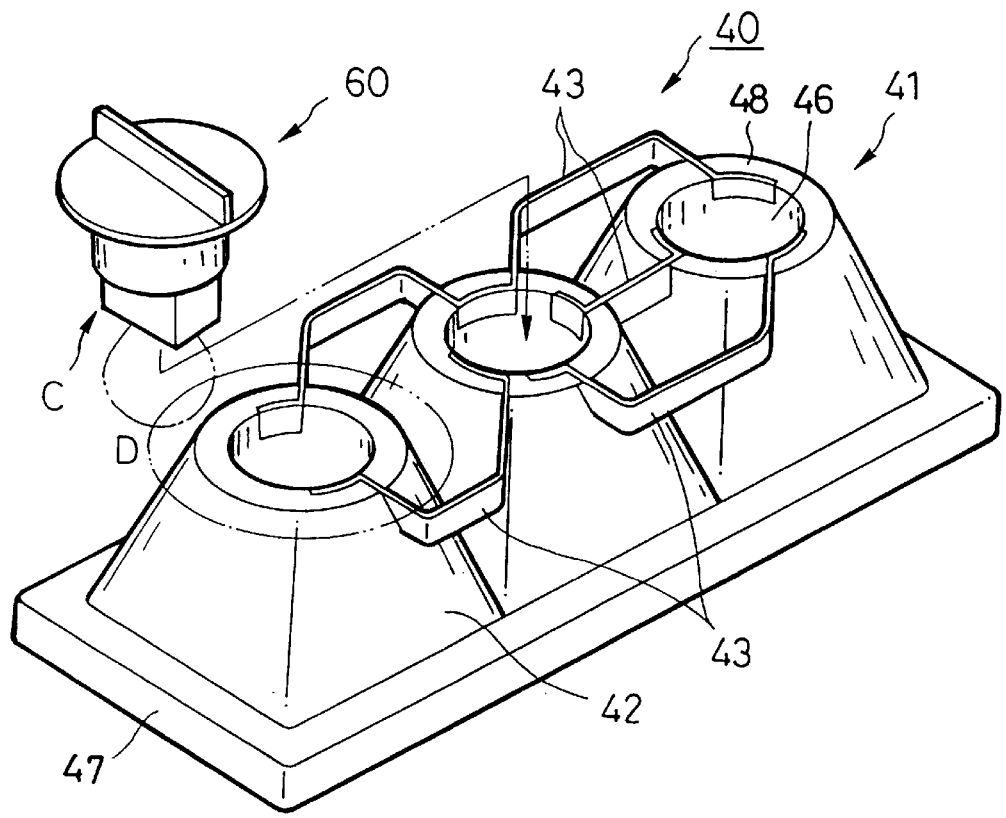
FIG. 5 is an exploded, perspective view showing a second embodiment of a rear combination lamp of the present invention.

FIG. 5 shows a rear combination lamp 40 according to a second embodiment of the present invention. The rear combination lamp 40 comprises a lamp body 41, and sockets 60 as described above for the first embodiment, but the construction of the second embodiment is partly different from that of the first embodiment. First, the lamp body 41 will be described.

Figure 6:
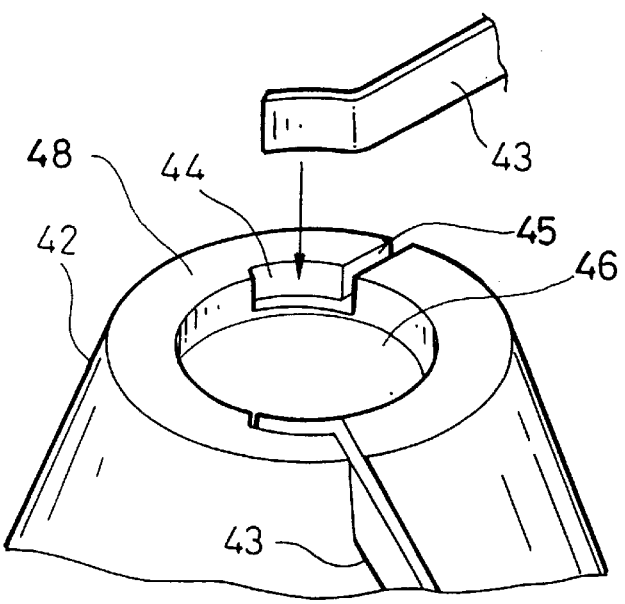
FIG. 6 is an enlarged, perspective view of a portion D of FIG. 5.

In this embodiment, also, the lamp body 41 includes socket mounting portions 42 and a lens portion 47. However, as best shown in FIG. 6, the construction of that portion in the vicinity of a socket mounting port 46 is different from that of the first embodiment. More specifically, conductor holding recesses 44 are formed in a peripheral surface of the socket mounting port 46, and conductor mounting grooves 45 are formed in a rear end surface 48 of the socket mounting portion 42. A plate-like conductor 43 is mounted by press fitting or the like in the conductor holding recess 44 and the conductor mounting groove 45, a distal end portion of the conductor 43 being so shaped as to be fitted in the conductor holding recess 44.

Figure 7:
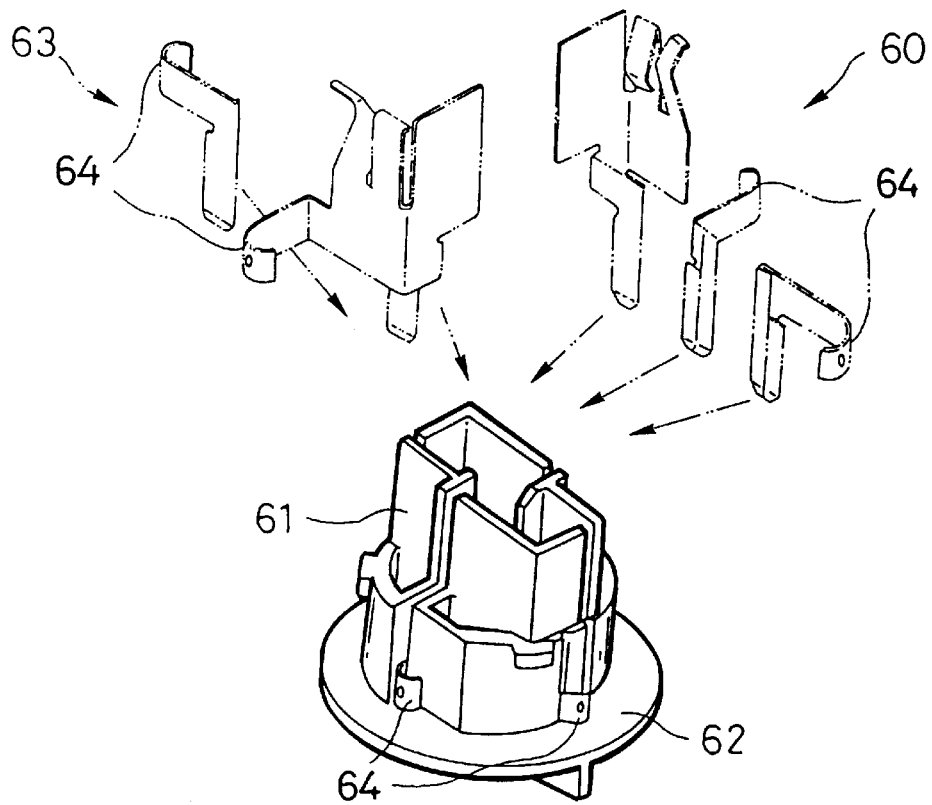
FIG. 7 is a view of a socket as seen in a direction of arrow C of FIG. 5.

Next, the socket 60 will be described with reference to FIG. 7. In this embodiment, also, the socket 60 comprises a socket body 61 and a flange 62, and each of connection terminals 63, mounted in the socket body 61, has a conductor contact portion 64 which is formed by bending a relevant portion of a plate material, and is resilient. However, in this embodiment unlike the first embodiment, the connection terminals 23 are mounted within the socket body 61 in such a manner that the conductor contact portions 64 project laterally (FIG. 7) from the socket body 61.

Figure 8:
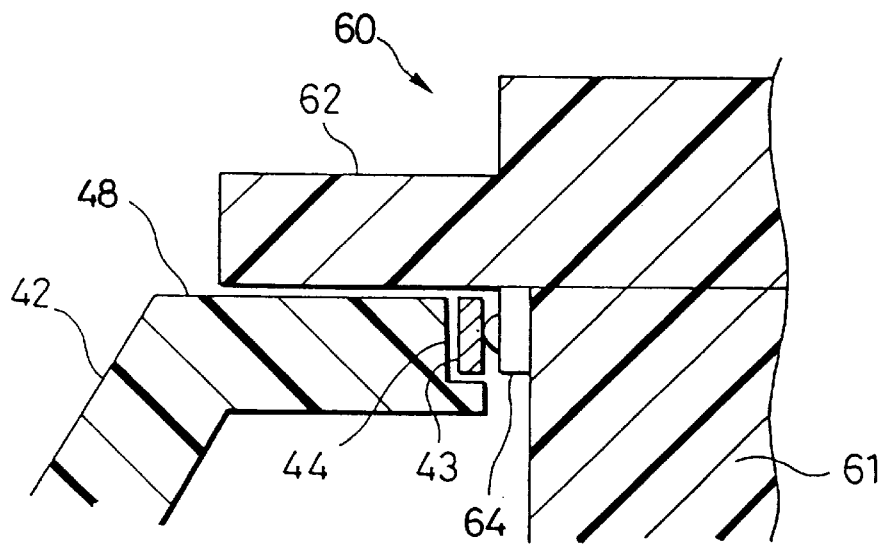
FIG. 8 is a cross-sectional view of the portion D of FIG. 5.

FIG. 8 shows a condition in which the socket 60 is mounted on the socket mounting portion 42. As is clear from this Figure, the conductor contact portion 64 is held in contact with the plate-like conductor 43 mounted in the conductor holding recess 44.

In the rear combination lamp 40 of this embodiment, the conductor holding recesses 44 are formed in the peripheral surface of the socket mounting port 46, and the conductor mounting grooves 45 are formed in the rear end surface 48 of the socket mounting portion 42, and each plate-like conductor 43 is mounted in the associated conductor holding recess 44 and the associated conductor mounting groove 45, and the conductor contact portions 64 project from the socket body 61 so as to contact the plate-like conductors 43, respectively. Each of the conductors has a plate-like configuration, and therefore can be positively electrically connected to the conductor contact portion 64, so that the reliability of the rear combination lamp 40 is further enhanced. And besides, the plate-like conductors 43 allow a large electric current to flow therethrough, and therefore this construction can be applied to a large-current circuit, and the versatility is further enhanced.

Third Embodiment

Figure 9:
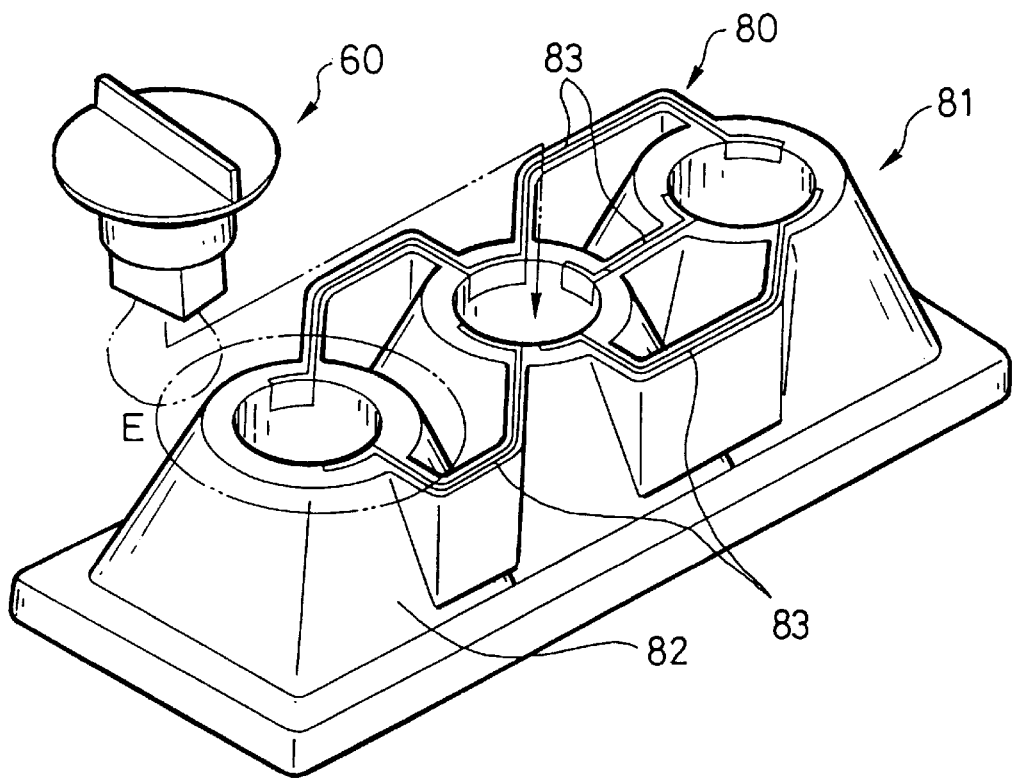
FIG. 9 is an exploded, perspective view showing a third embodiment of a rear combination lamp of the present invention.

FIG. 9 shows a rear combination lamp 80 according to a third embodiment of the present invention. The rear combination lamp 80 comprises a lamp body 81, and sockets 60 as described above for the second embodiment. However, the construction of the lamp body 81 of the third embodiment is partly different from that of the second embodiment.

Figure 10:
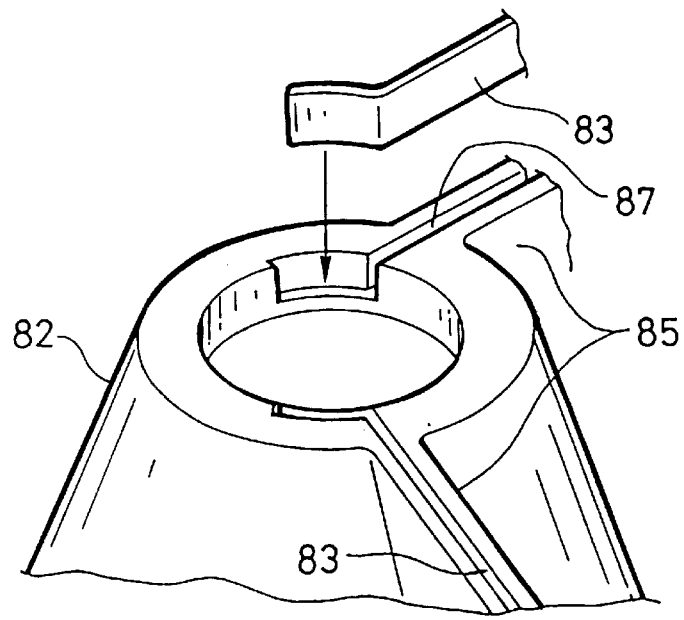
FIG. 10 is an enlarged, perspective view of a portion E of FIG. 9.
Figure 11:
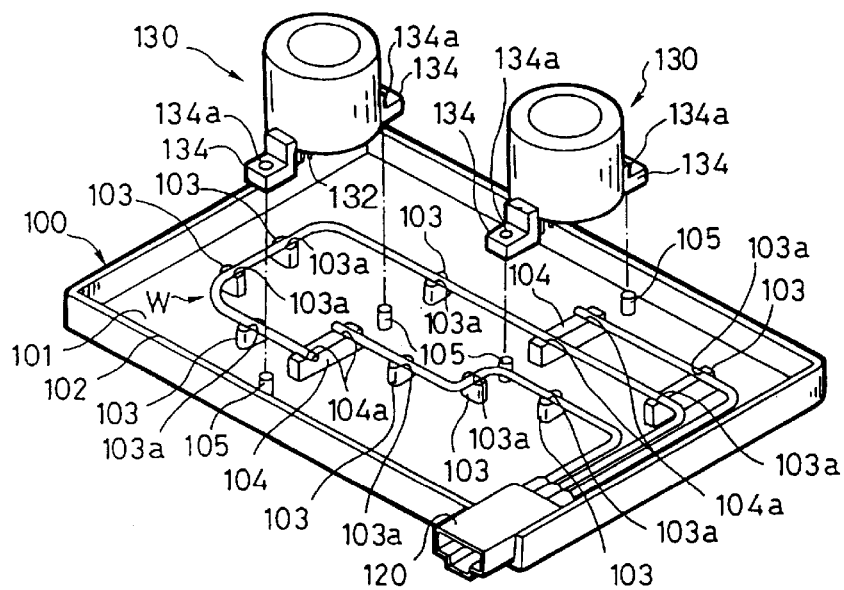
FIG. 11 is an exploded, perspective view of a conventional rear combination lamp.
Figure 12:
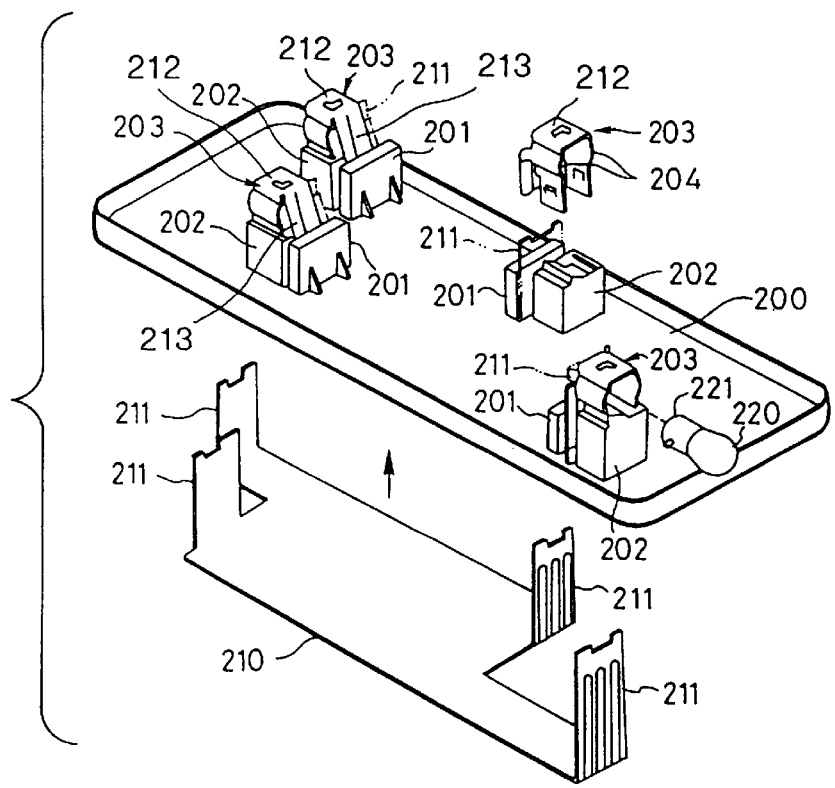
FIG. 12 is an exploded, perspective view of another conventional rear combination lamp.

More specifically, as shown in FIG. 10, insulating ribs 85 for holding plate-like conductors 83 are formed on outer surfaces of socket mounting portions 82. The insulating ribs 85 are formed integrally with the socket mounting portions 82.

In the rear combination lamp 80 of this embodiment, the insulating ribs 85 for holding the plate-like conductors 83 are formed on the outer surfaces of the socket mounting portions 82, and therefore the circuits of the plate-like conductors 83 are kept insulated from each other in the vicinity of the socket mounting portion 82, and also the strength of holding the plate-like conductors 83 on the socket mounting portion 82 is increased, and therefore the reliability of the rear combination lamp 80 is further enhanced.

In the rear combination lamp of the present invention, the conductor mounting grooves are formed in the end portion of the socket mounting port, and the conductors are mounted respectively in the conductor mounting grooves. Thus, the conductors are mounted directly on the lamp body, and therefore there is no need to provide a board or a flexible printed circuit-board, and the number of the component parts is reduced.

And besides, if the conductors are mounted automatically, the efficiency of the production is enhanced.

When the socket is mounted on the lamp body, the conductor contact portion is automatically brought into contact with the conductor mounted on the end portion of the socket mounting port, and therefore a press-connecting step is not necessary, and the production efficiency is further enhanced.

In the rear combination lamp of the present invention, the conductor is a wire-like conductor, and the wire-like conductors are installed on the rear end surface of the socket mounting portion.

Therefore, each wire-like conductor is cut into a required length, and is installed on the rear end surface of the socket mounting portion, and by doing so, the wiring can be easily applied to various vehicles having different structures and sizes, and the versatility is enhanced.

In the rear combination lamp of the present invention, the socket mounting portion has the wiring ribs for holding the wire-like conductor therebetween. Therefore, the strength of holding the wire-like conductor on the socket mounting portion is enhanced.

In the rear combination lamp of the present invention, the conductor is a plate-like conductor, and the plate-like conductors are mounted respectively in the conductor holding recesses formed in the peripheral surface of the socket mounting port. Therefore, an electrical connection between the conductor contact portion and the conductor is positively made, so that the reliability of the rear combination lamp is further enhanced. And besides, the plate-like conductor allows a large current to flow therethrough, and this construction can be applied to a large-current circuit, and the versatility is further enhanced.

In the rear combination lamp of the present invention, the socket mounting portion has the insulating ribs for holding the plate-like conductors. Therefore, the circuits of the plate-like conductors are kept insulated from each other in the vicinity of the socket mounting portion, and also the strength of holding the plate-like conductors on the socket mounting portion is enhanced, and therefore the reliability of the rear combination lamp is further enhanced.

What is claimed is:

1. A rear combination lamp, comprising:
    a lamp;
    a socket holding the lamp, the socket including a plurality of connection terminals which are electrically connected to the lamp;
    a plurality of conductor contact portions respectively formed on the connection terminals;
    a lamp body, comprising at least one hollow socket mounting portion, wherein the socket mounting portion is formed as a shaped surface of said lamp body;
    a socket mounting port, formed in a rear side of the socket mounting portion, in which the socket is detachably mounted;
    a reflection mirror provided on an inner surface of the socket mounting portion;
    a front open portion formed in a front side of the socket mounting portion;
    a lens portion sealingly closing the front open portion of the socket mounting portion;
    a plurality of wiring grooves formed in an end portion of the socket mounting portion; and
    a plurality of wire-like conductors respectively mounted in the wiring grooves;
    wherein when the socket is mounted in the socket mounting port, the wire-like conductors within the wiring grooves are contiguous to, and are respectively held in direct electrical contact with, the conductor contact portions.

2. The rear combination lamp of claim 1, wherein the socket includes a socket body and a flange, the conductor contact portions each has resiliency, and the conductor contact portions respectively project from the flange so as to electrically contact the respective wire-like conductors when the socket is mounted in the socket mounting port.

3. The rear combination lamp of claim 1, wherein the socket mounting portion has wiring ribs, and wherein the wire-like conductor is held between the wiring ribs.

4. The rear combination lamp of claim 2, wherein the socket mounting portion has wiring ribs, and wherein the wire-like conductor is held between the wiring ribs.

5. The rear combination lamp of claim 1, wherein said lamp body comprises:
    a plurality of the socket mounting portions, each respectively including:
        a socket mounting port,
        a plurality of the wiring grooves formed in the end portion of the socket mounting portion, and
        a plurality of the wire-like conductors mounted in the conductor mounting grooves,
    wherein one of the wire-like conductors is mounted in the wiring grooves formed in the end portions of at least two of the socket mounting ports.

6. A rear combination lamp, comprising:
    a lamp;
    a socket holding the lamp, the socket including a plurality of connection terminals which are electrically connected to the lamp;
    a plurality of conductor contact portions respectively formed on the connection terminals;
    a lamp body, comprising at least one hollow socket mounting portion, wherein the socket mounting portion is formed as a shaped surface of said lamp body;
    a socket mounting port, formed in a rear side of the socket mounting portion, in which the socket is detachably mounted;
    a reflection mirror provided on an inner surface of the socket mounting portion;
    a front open portion formed in a front side of the socket mounting portion;
    a lens portion sealingly closing the front open portion of the socket mounting portion;
    a plurality of conductor mounting grooves formed in an end portion of the socket mounting portion;
    a plurality of conductor holding recesses formed in an inner peripheral surface of the socket mounting port, and
    a plurality of plate-like conductors respectively mounted in the conductor mounting grooves and the conductor holding recesses;
    wherein when the socket is mounted in the socket mounting port, the plate-like conductors within the conductor holding recesses are contiguous to, and are respectively held in direct electrical contact with, the conductor contact portions.

7. The rear combination lamp of claim 6, wherein the socket includes a socket body and a flange, the conductor contact portions each has resiliency, and the conductor contact portions respectively project from the socket body so as to electrically contact the respective plate-like conductors when the socket is mounted in the socket mounting port.

8. The rear combination lamp of claim 6, wherein the socket mounting portion has insulating ribs, and wherein the plate-like conductors are respectively held in the insulating ribs.

9. The rear combination lamp of claim 7, wherein the socket mounting portion has insulating ribs, and wherein the plate-like conductors are respectively held in the insulating ribs.

10. The rear combination lamp of claim 6, wherein said lamp body comprises:

a plurality of the socket mounting portions, each respectively including:
   a socket mounting port,
   a plurality of the conductor holding recesses formed in the end portion of the socket mounting portion, and
   a plurality of the plate-like conductors mounted in the conductor holding recesses, wherein one of the plate-like conductors is mounted in the conductor holding recesses formed in the end portions of at least two of the socket mounting ports.

* * * * *